Patented Aug. 25, 1931

1,820,274

UNITED STATES PATENT OFFICE

ALBERT HEMPEL, OF LEIPZIG-OETZSCH, GERMANY

MANUFACTURE OF PHENOLS

No Drawing. Application filed July 7, 1930, Serial No. 466,033, and in Germany April 9, 1929.

This invention relates to the manufacture of phenates and it has particular application to the manufacture of alkali phenates by the direct fusion of the corresponding alkali metal sulfonate with an alkali.

In my copending application filed of even date bearing Serial Number 466,034 there is disclosed a process whereby a fused reaction mixture consisting of sodium phenate and sodium sulphite may be separated physically to obtain a sodium phenate of technical purity which may be used without further purification in subsequent syntheses. The present application deals specifically with an improved procedure for effecting the fusion, and may be used advantageously in conjunction with the process set forth in my aforementioned application.

The sulfonate fusion process for manufacturing a phenol involves fusing the sulfonate with caustic soda whereby the sodium phenate and sodium sulphite are formed. Thereafter the phenol is liberated by treating the phenate with an acid reacting substance.

The ultimate yield of phenate is dependent upon many factors including temperature and time of the fusion, the quantity of tars and oxidation products formed, the quantity of excess caustic employed, the uniformity of heating, the condition and form of the caustic as well as the sulfonate, and various other factors. The selection of an optimum cycle of operation for the production of phenates necessitates among others, a consideration of the fact that the rate of the desired reaction as well as the rate of by-product formation are accelerated by increased fusion temperatures; that the reaction tends to complete itself more rapidly by utilizing an excess of caustic; that such excess of caustic is not recoverable; that the fuel cost is a function of the temperature to be maintained as well as the time of fusion, and that the deterioration of the equipment is accelerated by increased fusion temperatures.

I have now discovered that the time required for the fusion may be reduced and the temperature thereof lowered without impairing the yield of phenate by effecting the fusion at reduced pressures and preferably in the absence of an oxidizing atmosphere. I have further found that the reduction in temperature is sufficient to enable one to conduct the fusion in a vapor or liquid heated kettle such, for example, as the Frederking fusion kettle which is well known to those skilled in the art.

The invention therefore contemplates the provision of a method of effecting fusions of aromatic sulfonates whereby the time and temperature required for such fusions is reduced, the yield of product maintained or improved while avoiding the formation of substantial amounts of tars and oxidation by-products.

The invention likewise contemplates the method of procedure for alkali fusions whereby the direct fire kettles may be eliminated in favor of a liquid or vapor heated type. Other objects will appear to those skilled in the art.

It has been suggested heretofore to effect causticization of sulfonates in an aqueous medium and under positive pressure. To the best of my knowledge this process has never been employed commercially. Moreover, the present process is to be distinguished therefrom in that it contemplates a fusion rather than a causticization in an aqueous medium. I am aware that it has likewise been suggested that destructive distillations as well as dry reactions such as the manufacture of acetone from calcium acetate be effected at reduced pressures. These, however, are not fusions in the sense that the term is employed in the art.

Phenates may be prepared by adding solid sulfonate directly to fused caustic soda, or by adding an aqueous solution of the sulfonate to the fused caustic soda. The invention is equally applicable regardless of the procedure employed. The time required for effecting the fusion is reduced substantially and the fusion temperature may be lowered without sacrificing other advantages. A specific example of an application of the principles of this invention is hereinafter set forth. It is to be understood that this description is exemplary only and is not limited thereby, but on the contrary is adaptable to many other embodiments of widely different characteristics.

A Frederking fusion kettle which is equipped with a liquid heating system capable of sustaining hydrostatic pressures corresponding to temperatures of at least 350° C., containing 225 parts of caustic soda (95%), is charged with 470 parts of sodium benzene sulfonate (85%) which corresponds to 400 parts of pure sulfonate. As the temperature of the charge approaches 300° C. a vacuum is applied to the charge whose magnitude is limited only by the ability of the equipment to remove the evolved vapors. The charge may evidence a tendency to froth excessively in case the temperature of the charge becomes too high or the degree of vacuum too great. The fusion is completed in 20–60 minutes after substantially all the vapors have been evolved and the temperature has attained 300°–350° C.

The resulting mixture will be found to contain approximately 235 parts of sodium phenate and 35 parts of free caustic. The phenate may be separated from the by-products in the manner set forth in my copending application referred to hereinabove. To this end sufficient phenol (approximately 83 parts) is added to combine with the free caustic, after which the fused mixture is allowed to stratify. The sodium phenate forms the upper layer which can be separated from the lower layer consisting essentially of sodium sulphite and various impurities including sodium sulphate, tars, and other products.

If desired, one may effect the fusion advantageously under reduced pressure by adding the sulfonate in the form of an aqueous solution to the fused caustic soda, or one may add both the sulfonate and alkali in solution form. Such procedure offers certain advantages in that the rate at which the solution is added to the fused mixture may be controlled easily and the material is otherwise more easily handled. In either case, however, one is enabled to effect the fusion in less time and at a lower temperature than would otherwise be required without the application of a partial vacuum. In case the phenate undergoes oxidation readily, it is advantageous to displace the air in the fusion kettle with an inert medium such for example as nitrogen.

Inasmuch as one is enabled to employ fluid or vapor heat, the tendency for local overheating is obviated and the opportunity for uniform heating assured. Moreover, the fact that the fusion may be effected at lower temperature reduces the tendency of by-product formation.

From the foregoing description, it should be apparent to those skilled in the art that I have provided a process for the manufacture of phenols by the sulfonate fusion method whereby one is enabled to reduce the time of fusion, increase the yield while operating at a lower reacting temperature and thereby obviate the necessity of a direct fire open fusion kettle, such as has been employed in practice heretofore. Although the principles of the invention have been described as they apply to the manufacture of sodium phenate, it is not so limited, but extends to the manufacture of other phenates by fusing corresponding aromatic sulfonates with an alkali.

What I claim is:

1. In the method of manufacturing sodium phenate by fusing the corresponding sulphonate with caustic soda, the improvement which consists in conducting the fusion under subatmospheric pressure conditions.

2. In the method of manufacturing sodium phenate by fusing the corresponding sulphonate with caustic soda, the improvement which consists in conducting the fusion under subatmospheric pressure conditions and in the presence of an inert atmosphere.

In testimony whereof, I affix my signature.

ALBERT HEMPEL.